(12) United States Patent
Gihm et al.

(10) Patent No.: US 11,487,044 B2
(45) Date of Patent: Nov. 1, 2022

(54) TRENCH CROSS-SECTION REFERENCE LINE SETTING DEVICE AND TRENCH CROSS-SECTION ANALYSIS METHOD USING THE SAME

(71) Applicant: KOREA INSTITUTE OF GEOSCIENCE AND MINERAL RESOURCES, Daejeon (KR)

(72) Inventors: Yong Sik Gihm, Seoul (KR); Kwangmin Jin, Chungju-si (KR); Jin Hyuck Choi, Daejeon (KR)

(73) Assignee: KOREA INSTITUTE OF GEOSCIENCES AND MINERAL RESOURCES, Daejeon (KR)

( * ) Notice: Subject to any disclaimer, the term of this patent is extended or adjusted under 35 U.S.C. 154(b) by 290 days.

(21) Appl. No.: 16/767,562

(22) PCT Filed: Dec. 5, 2018

(86) PCT No.: PCT/KR2018/015348
§ 371 (c)(1),
(2) Date: May 27, 2020

(87) PCT Pub. No.: WO2019/112324
PCT Pub. Date: Jun. 13, 2019

(65) Prior Publication Data
US 2021/0173116 A1 Jun. 10, 2021

(30) Foreign Application Priority Data
Dec. 5, 2017 (KR) .......................... 10-2017-0166019

(51) Int. Cl.
*G01B 11/30* (2006.01)
*G01V 8/20* (2006.01)

(52) U.S. Cl.
CPC ................ *G01V 8/20* (2013.01); *G01B 11/30* (2013.01)

(58) Field of Classification Search
CPC .......... G01V 8/20; G01B 11/30; F16M 11/00; G06T 7/60; H04N 5/225
(Continued)

(56) References Cited

U.S. PATENT DOCUMENTS

| 2003/0016344 A1* | 1/2003 | Norman | ............... G01C 15/002 |
| | | | 356/4.01 |
| 2006/0192946 A1* | 8/2006 | Walser | ..................... G01C 1/04 |
| | | | 356/138 |

(Continued)

FOREIGN PATENT DOCUMENTS

| KR | 10-0933329 B1 | 12/2009 |
| KR | 10-2011-0127517 A | 11/2011 |

(Continued)

OTHER PUBLICATIONS

Kim, et al., "Estimated earthquake magnitude from the Yugye Fault displacement on a trench section," Journal of the Geological Society of Korea, Mar. 2006, vol. 42, No. 1, pp. 79-94.

(Continued)

*Primary Examiner* — Tung T Vo
(74) *Attorney, Agent, or Firm* — Lewis Roca Rothgerber Christie LLP (57) ABSTRACT

The present invention relates to a trench cross-section reference line setting device, comprising: a trench reference line setting body unit (100) for setting a trench cross-section reference line, wherein the trench reference line setting body unit (100) has a sensor unit (10) at the center thereof, two horizontal units (20) orthogonal to each other on the upper surface thereof, and three laser light source units (30) and a grid photographing unit (110'), respectively, on the side (Continued)

surfaces thereof; a reference line setting tripod unit (200) rotatably coupled to the trench reference line setting body unit (100) and having a posture adjusting unit (230) and a height adjusting unit (250); and a trench stratum analysis server (300) for receiving a fault image photographed by the grid photographing unit (110') of the trench reference line setting body unit (100) and creating a stratum map of a trench cross-section structure.

9 Claims, 10 Drawing Sheets

(58) Field of Classification Search
USPC .......................................................... 348/135
See application file for complete search history.

(56) References Cited

U.S. PATENT DOCUMENTS

| | | | | |
|---|---|---|---|---|
| 2011/0095763 | A1* | 4/2011 | Linscott | G01V 3/12 |
| | | | | 324/72 |
| 2012/0163656 | A1* | 6/2012 | Wang | G06V 20/10 |
| | | | | 382/103 |
| 2016/0010987 | A1* | 1/2016 | Ishida | G01C 17/34 |
| | | | | 33/292 |
| 2016/0061954 | A1* | 3/2016 | Walsh | G01C 15/002 |
| | | | | 356/139.03 |
| 2016/0138919 | A1* | 5/2016 | Green | G01C 15/002 |
| | | | | 348/135 |
| 2017/0307370 | A1* | 10/2017 | Tanaka | G01C 1/04 |
| 2018/0293725 | A1* | 10/2018 | Ohshima | G01N 21/88 |
| 2019/0154439 | A1* | 5/2019 | Binder | G01B 11/026 |
| 2020/0175666 | A1* | 6/2020 | Ohshima | G06T 7/60 |

FOREIGN PATENT DOCUMENTS

| | | |
|---|---|---|
| KR | 10-1249660 B1 | 4/2013 |
| KR | 10-2015-0093340 A | 8/2015 |
| KR | 10-1561742 B1 | 10/2015 |
| KR | 10-1737521 B1 | 5/2017 |
| KR | 10-1765899 B1 | 8/2017 |
| KR | 10-1783754 B1 | 10/2017 |

OTHER PUBLICATIONS

Jin, et al., "Study on developing characteristics of Bophi Vum chromite mineralized zone in the northwestern Myanmar based on the trench survey," Journal of the Geological Society of Korea, Apr. 2014, vol. 50, No. 2, pp. 293-307.

* cited by examiner

TRENCH CROSS-SECTION REFERENCE LINE SETTING DEVICE AND TRENCH CROSS-SECTION ANALYSIS METHOD USING THE SAME

CROSS-REFERENCE TO RELATED APPLICATION(S)

This application is a National Phase Patent Application of International Patent Application Number PCT/KR2018/015348, filed on Dec. 5, 2018, which claims priority of Korean Patent Application No, 10-2017-0166019, filed Dec. 5, 2017, the entire contents of both of which are incorporated herein by reference.

TECHNICAL FIELD

The present invention relates to a trench cross-section baseline setting device and a trench cross-section analysis method using the same, and more particularly, to a trench cross-section baseline setting device in which a position of the trench cross-section baseline setting device is automatically made to be vertical by a sensor part, and a laser mark is formed on the trench cross-section by projecting a light source from a laser light source part; and a trench cross-section analysis method using the same.

BACKGROUND ART

In ancient-earthquake studies, investigations have generally conducted through trench excavation across active faults (e.g. McCalpin, 1996; Burbank and Anderson, 2001). Also in Korea, recently, there is increasing interest in the active fault (Gyeong Jae-bok, Jang Tae-woo, 2001; Ree et al., 2003; Cheong et al., 2003; Kim et al., 2004; Ree and Kwon, 2005), and many trenches are being performed due to the development of the geological survey techniques for the quaternary fault (Gyeong Jae-bok et al., 1999; Korea Institute of Geoscience and Mineral Resources, 2000; Kim et al., 2004; Kim Jeong-hwan et al., 2005).

If the trench is made in a proper scale at a proper location, a lot of information can be obtained on the characteristics of fault motions, displacements and recurrence cycle due to past earthquakes, etc. (e.g., McCalpin, 1996; Burbank and Anderson, 2001).

Except for an ancient seismograph in China, a modern seismograph was developed in 1887 which exceeded only over 100 years. In Korea, since the seismograph was first installed in 1905, earthquakes have been recorded and it has now been only 100 years. Therefore, in areas where the occurrence frequency of large-scale earthquakes is relatively low and the recurrence cycle of large earthquakes with an earthquake magnitude equal to or more than 6 to 7 is relatively long as in Korea, it is very important to study and prepare for earthquake disasters through the trench survey for the active faults.

Figure 1:
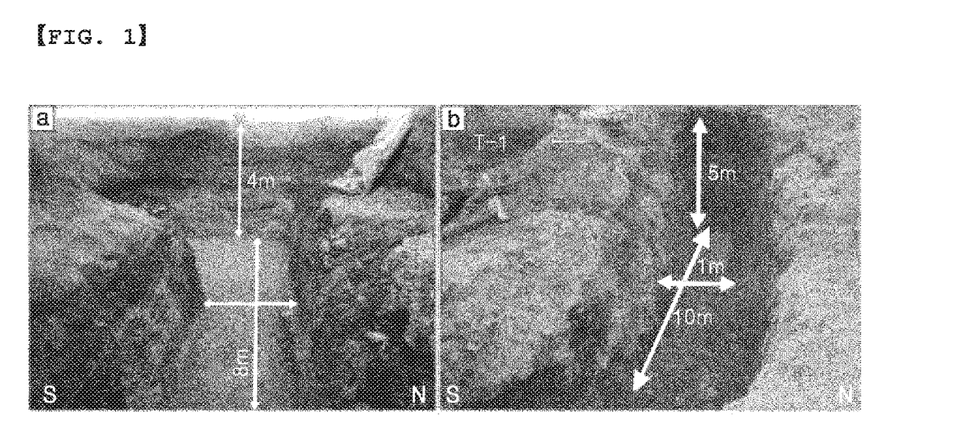
FIG. 1 is a schematic view for explaining a trench structure.

Referring to FIG. 1, in order to conduct a trench survey, a precise field geological survey should be preceded in advance, and a trench should be performed in a direction perpendicular to a fault at a location where the fault is best exposed. For example, when selecting the location of the trench, a section that can best show a relationship between a fault and a quaternary stratum, an evidence indicating a previous fault event, etc. is selected. Although the general strike of the Yangsan fault is N-S or NNE-SSW (Gyeong Jae-bok, Jang Tae-woo, 2001), when the Yugye fault at the trench site shows a strike of NNE-SSW to NE-SW, three trenches may be performed in a NW-SE direction which is almost perpendicular thereto.

Figure 2A:
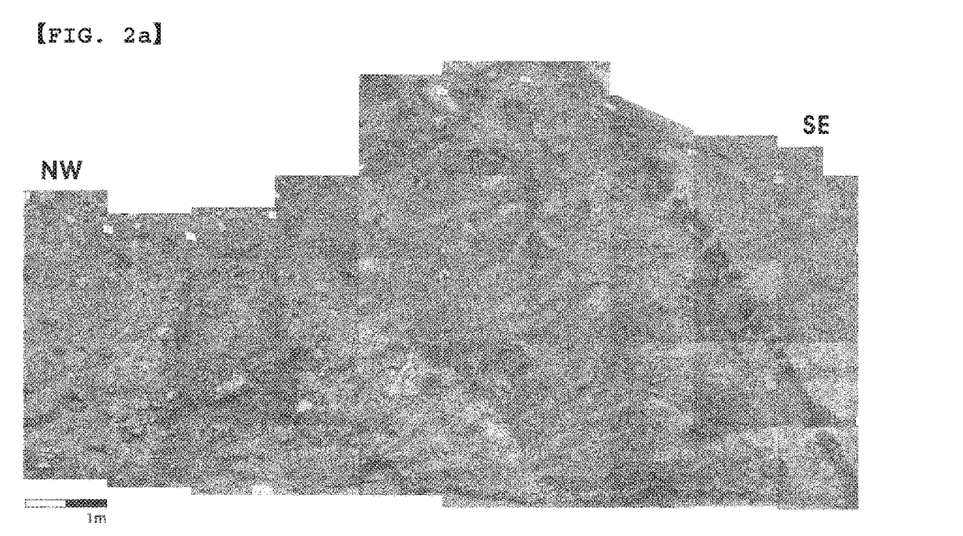
FIG. 2a is a photograph showing a trench cross-section structure.
Figure 2B:
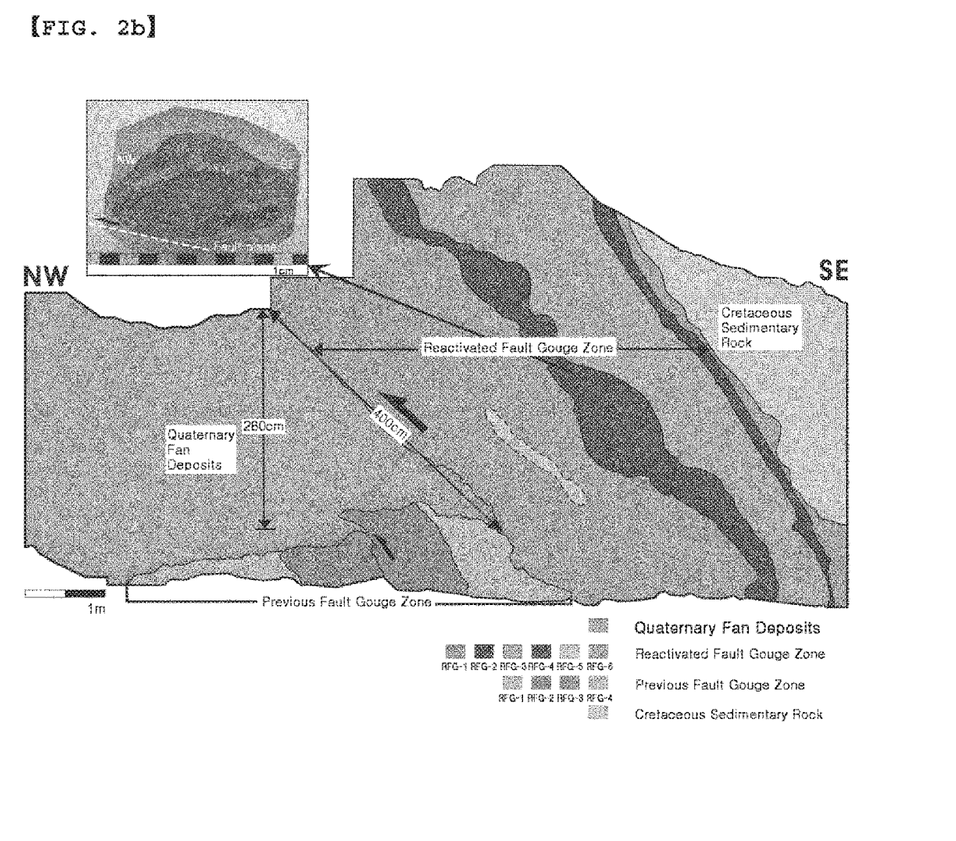
FIG. 2b is a cross-sectional view showing a trench cross-section structure.

Referring to FIGS. 2a and 2b, one embodiment of a trench is shown. Since the strike/inclination of the Yugye fault is approximately N40°E/50°SE, the trench is performed at N66°W, which is almost perpendicular to the strike of the fault, and a size of the trench is 2.4 m wide, 20 m long, and 3~5 m deep.

In the trench cross-section, a grid for sketching is provided in unit of 1 m×1 m, respectively, using a twine for two sections parallel to the trench direction. When measuring a thickness or displacement, it is directly measured using a tape measure for accuracy; and when making a detailed sketch, an iron chuck is used to determine the exact location. A high-resolution picture is first taken using a digital camera for a gridded section, and then is synthesized through the indoor operation of computer. In the outdoor, a sketch is made directly using a grid paper. The sketched work view and the synthesized picture of FIG. 2a are compared again in the indoor and the outdoor to repeat a correction several times, and then a sketch of a northern section of FIG. 2b is completed. A sample is collected from fault gouge zone to produce and observe a rock fragment for microstructure, and, in order to more accurately understand the motion characteristics of a reactivated fault zone, a sample is collected using a cylindrical aluminum pipe with a length of 30 cm and a diameter of 5 cm in the respective fault gouge zones of a southern section. A pipe is inserted horizontally in the center of the respective fault gouge zones at a height of about 2 m from the bottom to collect a total of six samples. After the pipe sample is collected, it is hardened with epoxy indoors and then a sample for observation of microstructure is prepared in order to observe the fault gouge which is unconsolidated material. In such trench survey, it is possible to infer the amount of seismic displacement accompanying the last fault movement by securing evidence indicating the displacement of the last fault movement.

Although there are many ways to recognize each event in a fault (e.g. McCalpin 1996; Burbank and Anderson, 2001), the most common and reliable recognizing method is to discover a colluvial wedge. In such trench, it is possible to recognize a piedmont alluvial fan deposit on existing fault clay, and the last reactivated fault clay that was separated from the existing fault clay and reactivated and upthrusted over the deposit. Therefore, from the top of the previous fault gouge zone to the top of the reactivated fault gouge zone that upthrusts the alluvial fan deposit can be interpreted as a seismic displacement due to the last seismic activity of the fault. From the seismic displacement obtained in this way, it is possible to estimate a seismic burst length of a fault using an empirical seismic displacement-seismic burst length relationship, which is a method frequently used for estimating extensions in an ancient earthquake fault whose length cannot be directly confirmed; and again, it is possible to calculate and test a magnitude of a moment earthquake accompanying the fault motion using an empirical relationship between a seismic displacement-moment seismic magnitude, and a seismic burst length-moment seismic magnitude (Wells and Coppersmith, 1994).

In order to perform such trench operation, it is necessary to maintain the horizontality of a grid to install the grid at regular intervals in the process of obtaining an image of the structure of the trench cross-section using fault displacement data of the trench cross-section.

In the past, there was a problem that in order to maintain the horizontality of the grid, a process of performing grid work by checking a level of water injected into a tube, and then fixing a pin 7 to a trench 1 section and connecting a thread 8 between a pin 7 and a pin 7 must be repeated several times.

PRIOR ART DOCUMENT

Non-Patent Document (Non-patent Document 1) Seismic Magnitude of the Yugye Fault Calculated using Fault Displacement Data of a Trench cross-section, Kim Young-Seok, Jin Kwang-Min (Geographical Society Journal Vol. 42, No. 1, p. 79-p. 94, March, 2006)

DETAILED DESCRIPTION OF THE INVENTION

Technical Problem

It is an object of the present invention to provide a trench cross-section baseline setting device in which a position of the trench cross-section baseline setting device is automatically made to be vertical by a sensor part, and a laser mark is formed on the trench cross-section by projecting a light source from a laser light source part, thus facilitating a trench operation, and a trench cross-section analysis method using the same.

Technical Solution

According to one embodiment of the present invention for achieving the above object, there is provided a trench cross-section baseline setting device comprising: a trench baseline setting body part including a sensor part; a plurality of horizontal parts provided on an upper surface of the trench baseline setting body part; a plurality of laser light source parts provided on side surfaces of the trench baseline setting body part; and a baseline setting tripod support part which is rotatably coupled to the trench baseline setting body part and has a posture adjusting part and a height adjusting part.

According to another embodiment of the present invention for achieving the above object, there is provided a trench cross-section analysis method using the trench cross-section baseline setting device of the present invention, the method comprising the steps of: positioning the trench cross-section baseline setting device in a horizontal posture (S1100); forming a laser marker on a trench cross-section with a laser light source part of the trench cross-section baseline setting device (S1200); fixing pins onto the laser marker and connecting between pin and pin with a thread to set a grid (S1300); photographing an image of the trench cross-section using a grid photographing part and transmitting the image to a trench stratum analysis server (S1400); and correcting the transmitted image at the trench stratum analysis server to prepare a stratum map of a trench cross-section structure (S1500).

The details of other embodiments are included in the following Detailed Description of the Embodiments and the attached Drawings.

Advantages and/or features of the present invention and methods for achieving them will become apparent with reference to various embodiments which are described below in detail in conjunction with the accompanying drawings. However, the present invention is not limited to the embodiments disclosed below, but may also be implemented in various different forms; the embodiments disclosed herein are provided only to make the disclosure of the present invention complete, and only to enable those skilled in the art to fully understand the scope of the present invention.

Advantageous Effects

According to the present invention, there can be provided a trench cross-section baseline setting device in which a position of the trench cross-section baseline setting device is automatically made to be vertical by a sensor part, and a laser mark is formed on the trench cross-section by projecting a light source from a laser light source part, thus facilitating a trench operation, and a trench cross-section analysis method using the same.

DETAILED DESCRIPTION OF THE EMBODIMENTS

Hereinafter, preferred embodiments of the present invention will be described in detail with reference to the accompanying drawings.

Advantages and/or features of the present invention and methods for achieving them will become apparent with reference to various embodiments described below in detail in conjunction with the accompanying drawings.

However, the present invention is not limited to the embodiments disclosed below, but may also be implemented in various different forms; the embodiments disclosed herein are provided only to make the disclosure of the present invention complete, and only to enable those skilled in the art to fully understand the scope of the present invention; and the scope of the present invention is defined only by the claims.

In addition, in the description of the present invention, if it is determined that related known technologies or the like may obscure the subject matters of the present invention, detailed descriptions thereof will be omitted.

FIG. 1 is a schematic view for explaining a trench structure.

FIG. 2a is a photograph showing a trench cross-section structure, and FIG. 2b is a cross-sectional view showing a trench cross-section structure.

Figure 3:
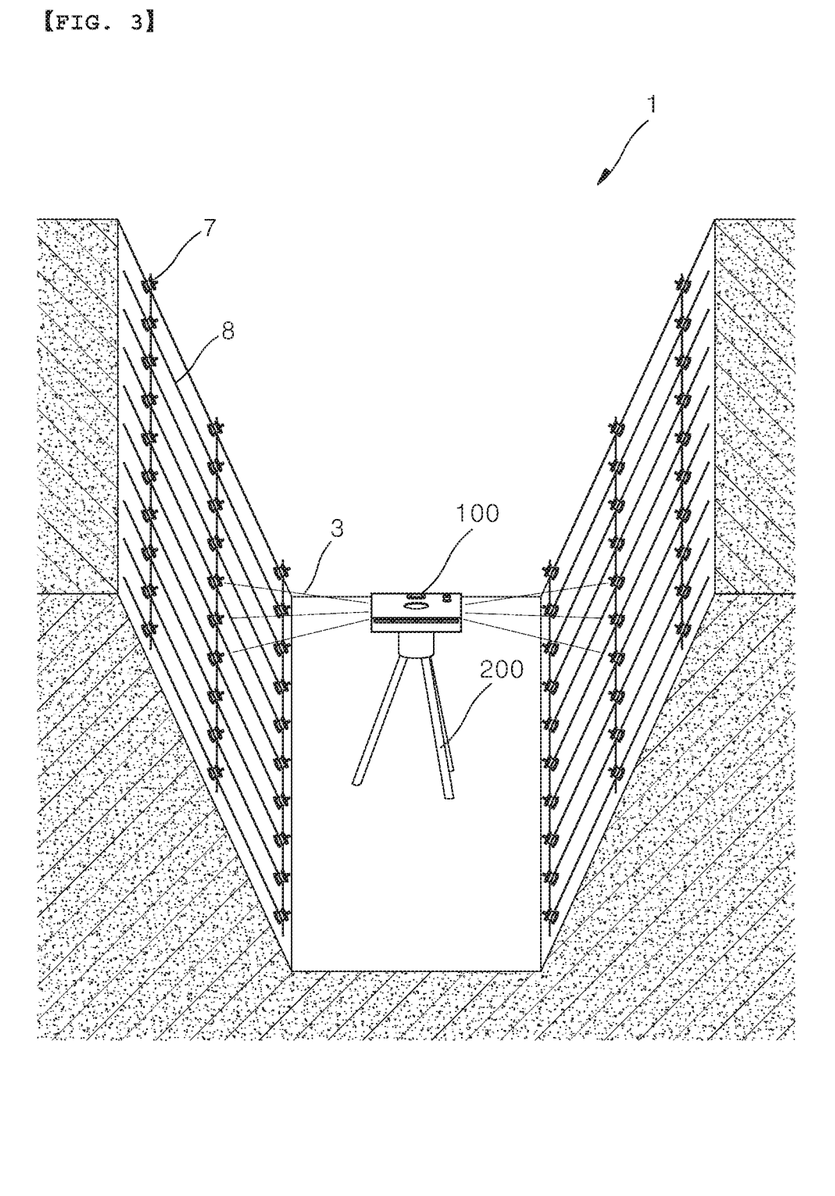
FIG. 3 is a schematic view showing a state in which a trench cross-section analysis is performed using a trench cross-section baseline setting device according to one embodiment of the present invention.

FIG. 3 is a schematic view showing a state in which a trench cross-section analysis is performed using a trench cross-section baseline setting device according to one embodiment of the present invention.

Figure 4:
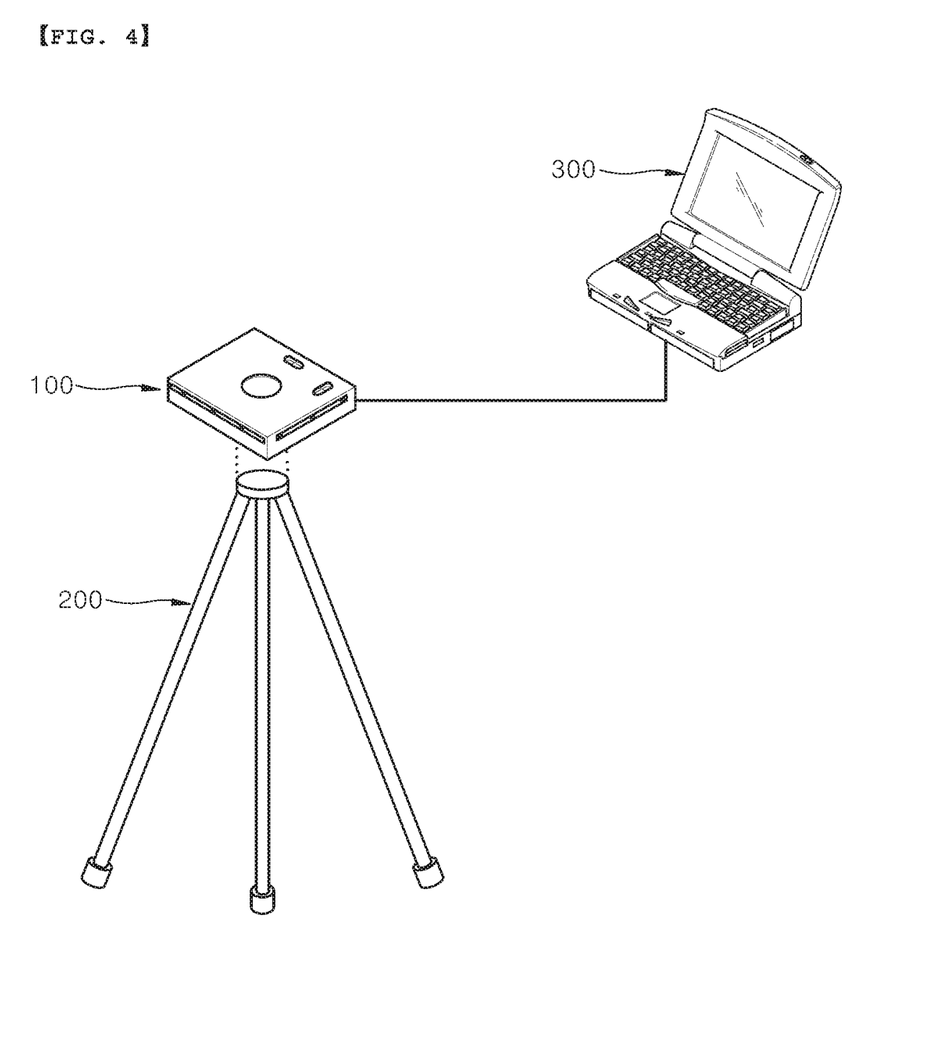
FIG. 4 is a perspective view of a trench cross-section baseline setting device according to one embodiment of the present invention.

FIG. 4 is a perspective view of a trench cross-section baseline setting device according to one embodiment of the present invention.

Figure 5:
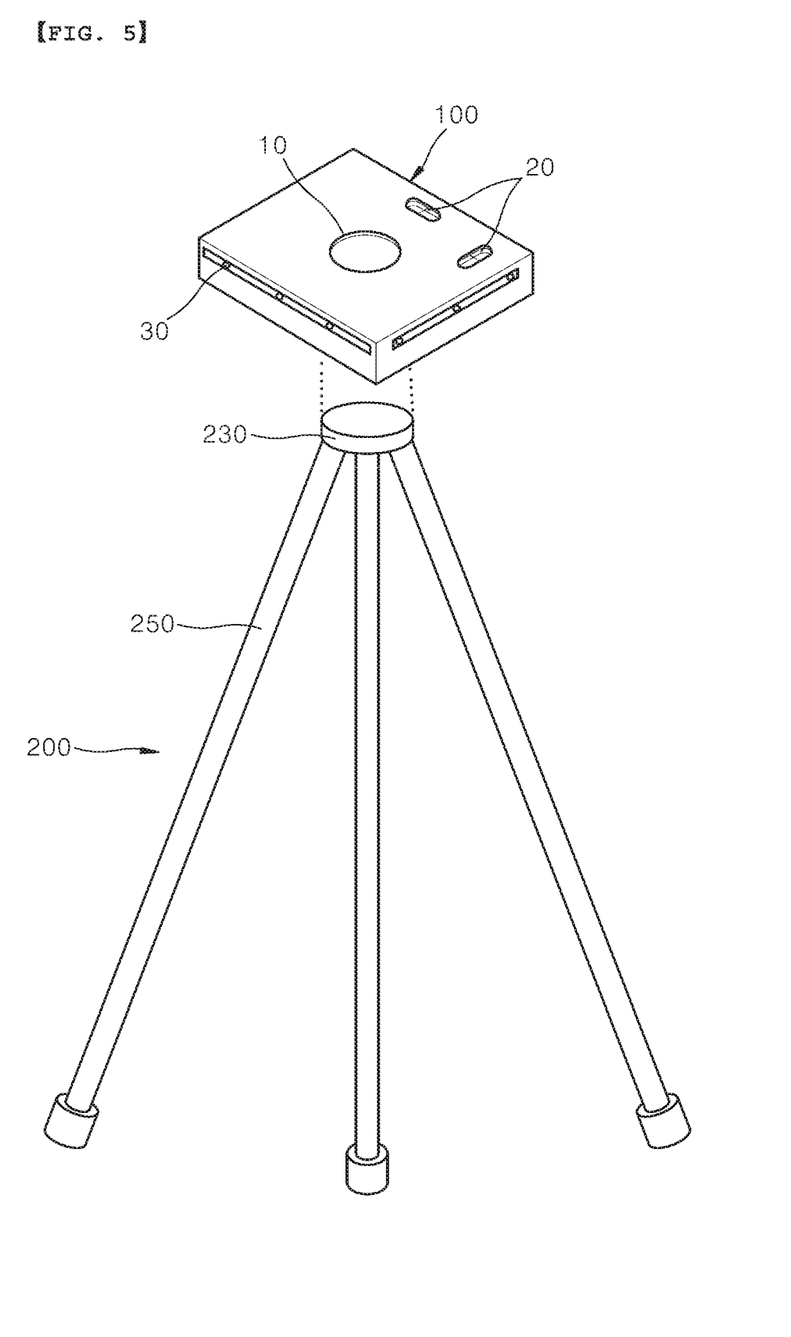
FIG. 5 is a perspective view showing the configuration of a trench baseline setting body part and a baseline setting tripod support part of a trench cross-section baseline setting device according to one embodiment of the present invention.

FIG. 5 is a perspective view showing the configuration of a trench baseline setting body part and a baseline setting tripod support part of a trench cross-section baseline setting device according to one embodiment of the present invention.

Figure 6:
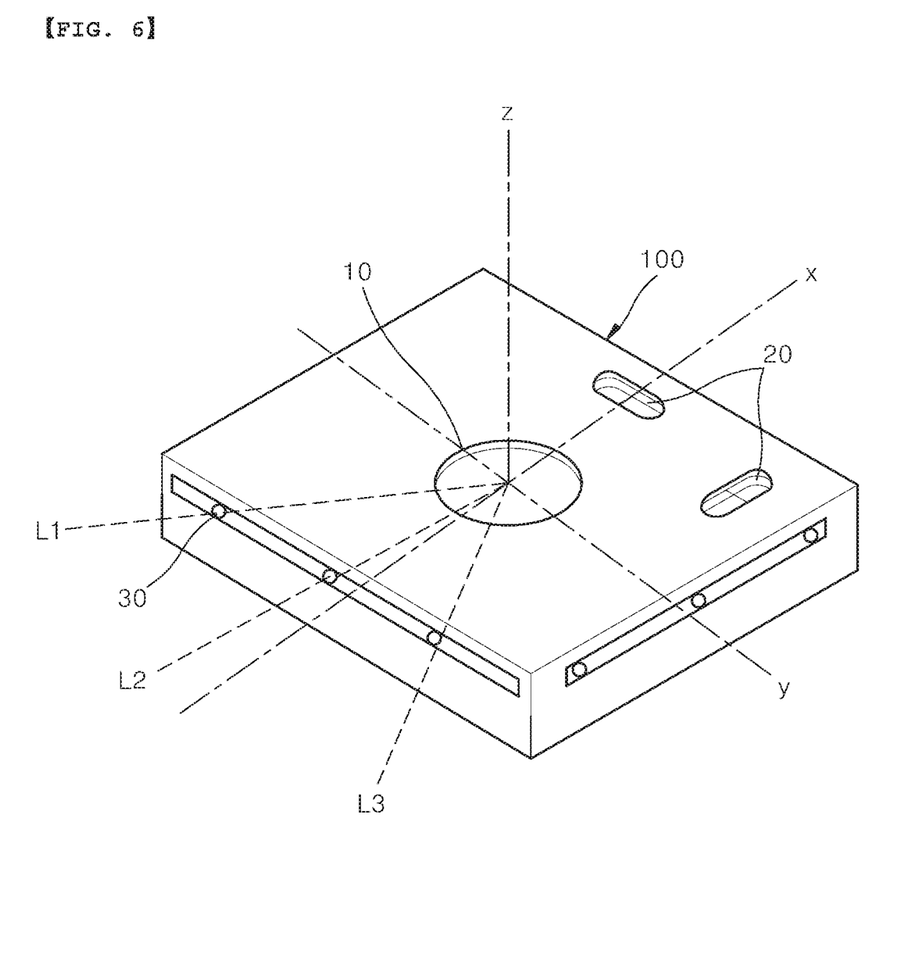
FIG. 6 is a perspective view of a trench baseline setting body part of a trench cross-section baseline setting device according to one embodiment of the present invention.

FIG. 6 is a perspective view of a trench baseline setting body part of a trench cross-section baseline setting device according to one embodiment of the present invention.

Figure 7:
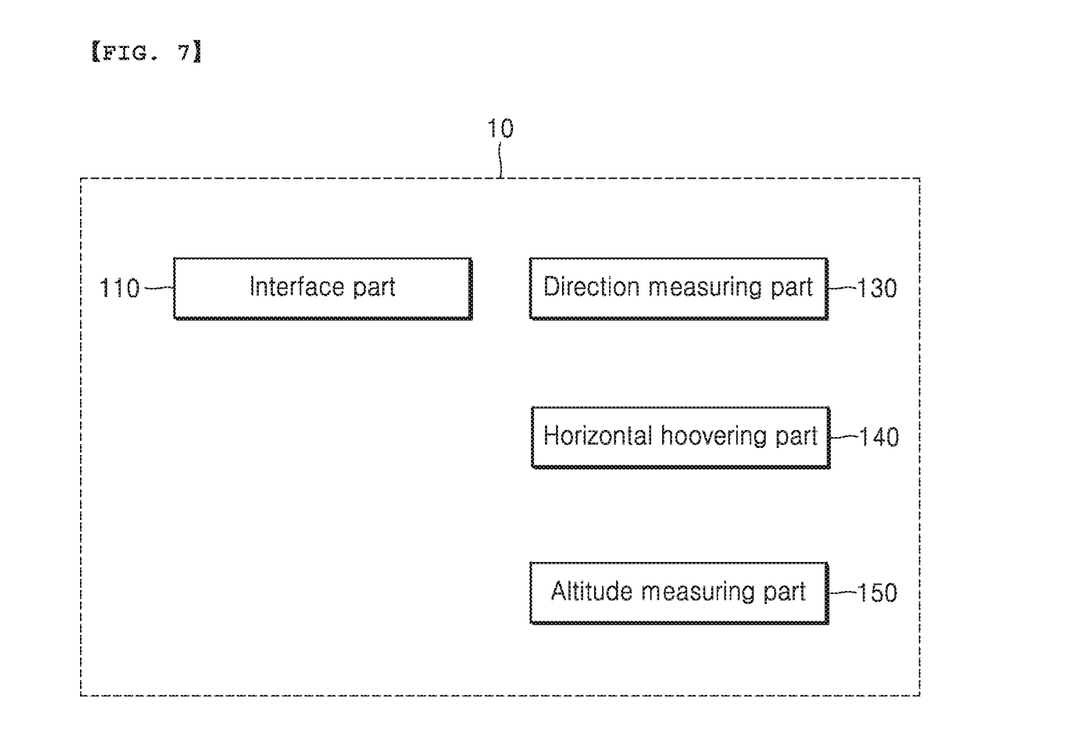
FIG. 7 is a configuration view of a sensor part of a trench baseline setting body part of a trench cross-section baseline setting device according to one embodiment of the present invention.

FIG. 7 is a configuration view of a sensor part of a trench baseline setting body part of a trench cross-section baseline setting device according to one embodiment of the present invention.

Figure 8:
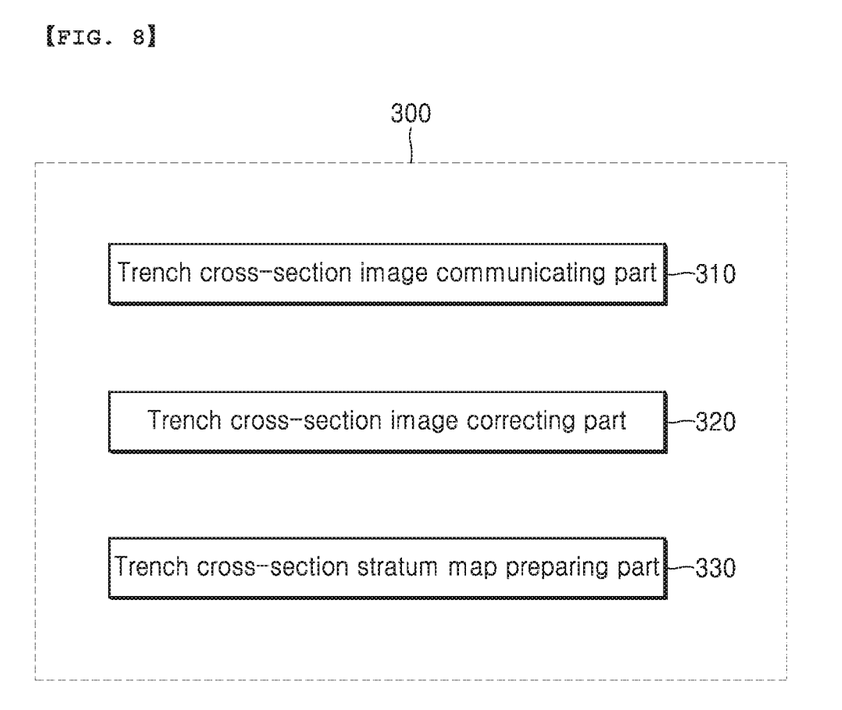
FIG. 8 is a configuration view of a trench stratum analysis server of a trench cross-section baseline setting device according to one embodiment of the present invention.

FIG. 8 is a configuration view of a trench stratum analysis server of a trench cross-section baseline setting device according to one embodiment of the present invention.

Figure 9:
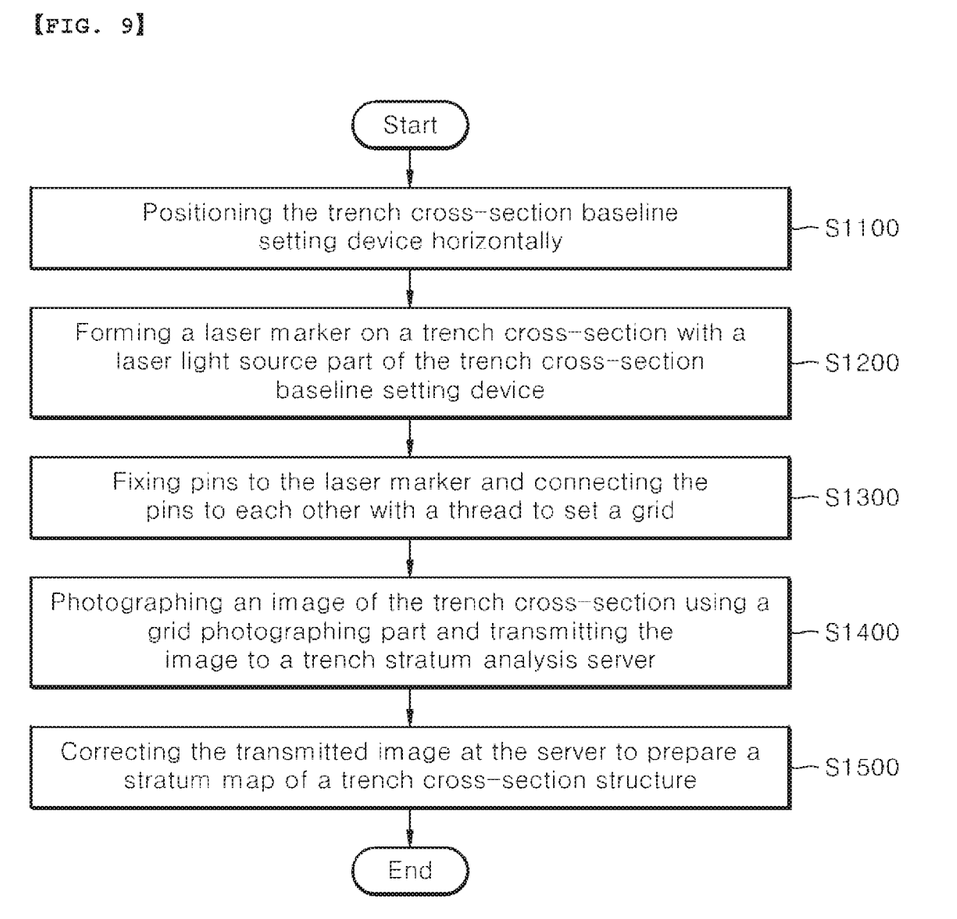
FIG. 9 is a flowchart illustrating a trench cross-section analysis method using a trench cross-section baseline setting device according to one embodiment of the present invention.

FIG. 9 is a flowchart illustrating a trench cross-section analysis method using a trench cross-section baseline setting device according to one embodiment of the present invention.

Figure 10:
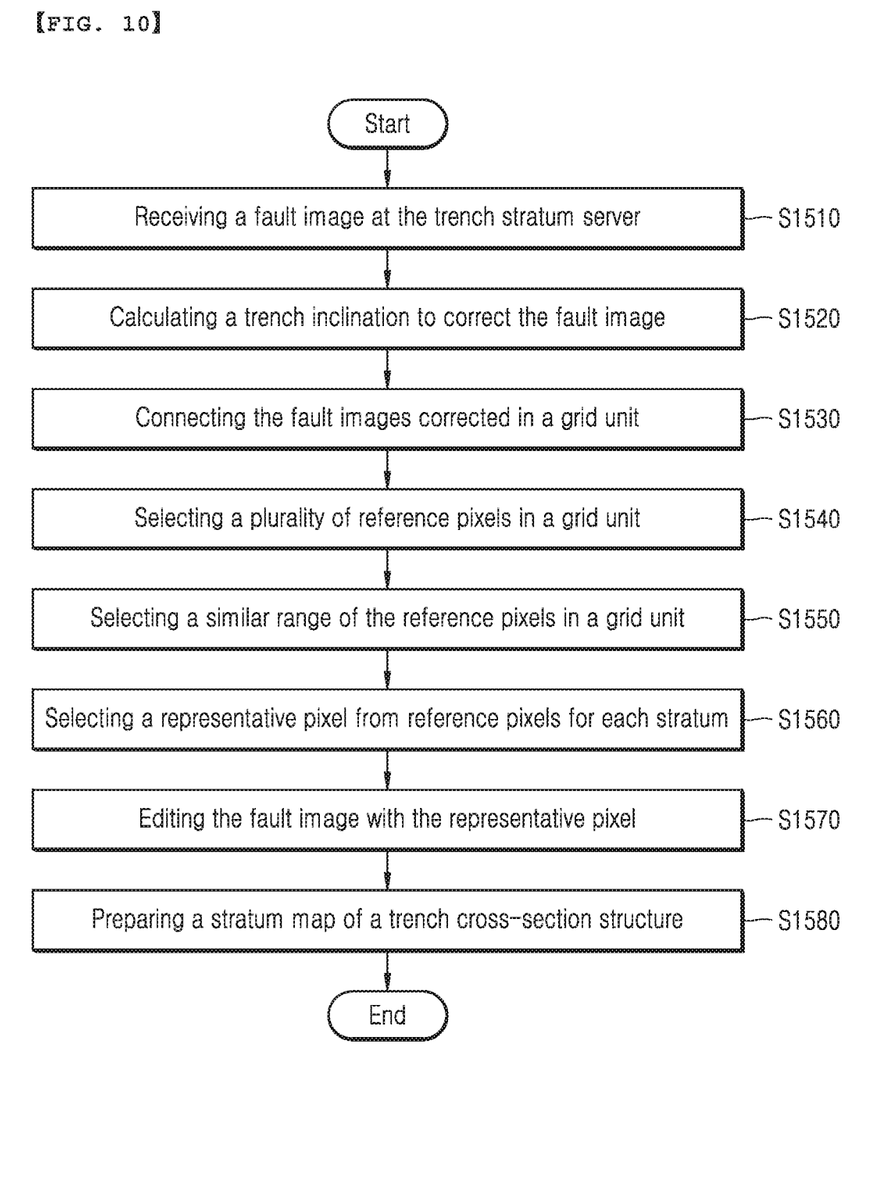
FIG. 10 is a flowchart illustrating a program for executing a trench cross-section analysis method using a trench cross-section baseline setting device according to one embodiment of the present invention.

FIG. 10 is a flowchart illustrating a program for executing a trench cross-section analysis method using a trench cross-section baseline setting device according to one embodiment of the present invention.

A trench cross-section baseline setting device of the present invention comprises: a trench baseline setting body part 100 for setting a trench cross-section baseline, wherein the trench baseline setting body part 100 has a sensor part 10 at the center thereof, two horizontal parts 20 orthogonal to each other on the upper surface thereof, and three laser light source parts 30 and a grid photographing part 110', respectively, on the side surfaces thereof; a baseline setting tripod support part 200 rotatably coupled to the trench baseline setting body part 100 and having a posture adjusting part 230 and a height adjusting part 250; and a trench stratum analysis server 300 for receiving a fault image photographed by the grid photographing part 110' of the trench baseline setting body part 100 to prepare a stratum map of a trench cross-section structure.

Referring to FIG. 3, the trench cross-section baseline setting device of the present invention uses the trench cross-section analysis method comprising the steps of: positioning a trench cross-section baseline setting device horizontally; forming a laser marker 3 on a trench 1 section with a laser light source part 30 of the trench cross-section baseline setting device; fixing pins 7 to the laser marker 3 and connecting between pin 7 and pin 7 with a thread 8 to set a grid; photographing an image of the trench 1 section using a grid photographing part 110' and transmitting the image to a trench stratum analysis server 300; and correcting the transmitted image at the trench stratum analysis server 300 to prepare a stratum map of a trench 1 section structure.

Referring to FIGS. 4 to 8, the trench cross-section baseline setting device of the present invention comprises a trench baseline setting body part 100, a baseline setting tripod support part 200, and a trench stratum analysis server 300.

The trench baseline setting body part 100 includes a sensor part 10, a horizontal part 20, and a laser light source part 30.

The sensor part 10 includes an interface part 110, a direction measuring part 130, a horizontal hoovering part 140, and an altitude measuring part 150.

The horizontal parts 20 are disposed such that the two parts are orthogonal to each other on the upper surface of the trench baseline setting body part 100.

The laser light source part 30 may be configured to operate only when the measured value of the horizontal hoovering part 140 of the sensor part 10 is 0°.

The baseline setting tripod support part 200 is rotatably coupled to the trench baseline setting body part 100 and includes a posture adjusting part 230 and a height adjusting part 250.

The posture adjusting part 230 controls the posture so that the measured value of the horizontal hoovering part 140 of the trench baseline setting body part 100 is 0°.

The height adjusting part 250 adjusts the height stepwise in response to the set grid interval.

The trench stratum analysis server 300 includes a trench cross-section image communicating part 310, a trench cross-section image correcting part 320, and a trench cross-section stratum map preparing part 330.

The trench stratum analysis server 300 receives a photographed fault image from the grid photographing part 110' of the trench baseline setting body part 100 to prepare a stratum map of a trench cross-section structure.

Referring to FIG. 5, it shows a state in which the trench baseline setting body part 100 and the baseline setting tripod support part 200 are connected to the posture adjusting part 230 to maintain the horizontality and the height is adjusted by the height adjusting part 250.

Referring to FIG. 6, the trench baseline setting body part 100 includes a sensor part 10 having a cuboid shape, two horizontal parts 20 on the upper surface, and three laser light source parts 30 on the respective side surfaces.

The sensor part 10 is provided at the center of the trench baseline setting body part 100, and includes an interface part 110, a direction measuring part 130, a horizontal hoovering part 140, and an altitude measuring part 150.

The horizontal parts 20 are arranged so that the two parts are orthogonal to each other on the upper portion of the trench baseline setting body 100, and are configured to check the horizontality with respect to an x-axis and a y-axis by visually confirming that a bubble in the liquid is in the center. When an additional horizontal part 20 is mounted on the side of the trench baseline setting body part 100, it is also possible to check the horizontality with respect to a z-axis.

Three laser light source parts 30 are provided on one side of the trench baseline setting body part 100 having a cuboid shape, and, among the three (L1, L2, L3) laser markers 3, the two (L1, L3) laser markers 3 at both ends are configured such that their directions form a right angle, and two (L1, L2) adjacent laser markers 3 are projected onto the trench 1 section at an angle of 45° to each other.

In addition, the laser light source part 30 may be configured to operate only when the measured value of the horizontal hovering part 140 of the sensor part 10 is 0°, and, therefore, the case where the laser marker 3 is formed on the trench cross-section is limited to the case where the horizontality is maintained, whereby the work of installing a grid on the trench 1 section can be efficiently performed.

Referring to FIG. 7, the trench baseline setting body part 100 of the trench cross-section baseline setting device of the present invention includes an interface part 110, a direction measuring part 130, a horizontal hoovering part 140, and an altitude measuring part 150.

When the interface part 110 is provided with a voice recognition sensor or a motion recognition sensor, control through the user's voice or motion is possible.

When the interface part 110 is mounted with a camera sensor, a grid photographing part 110' is installed, and, thus, it is possible to photograph an image of the trench cross-section in grid unit.

The direction measuring part 130 is composed of a geomagnetic sensor, and indicates the direction of the east, west, north or south in which the trench baseline setting body part 100 faces.

The horizontal hoovering part 140 is composed of a geomagnetic sensor and GPS, and indicates whether the trench cross-section baseline setting device is horizontal with respect to sea level or ground level.

When the horizontal hovering part 140 transmits a signal to the posture adjusting part 230 of the baseline setting tripod support part 200 in case the baseline setting device is not horizontal, the posture adjusting part 230 may be rotated and operated such that an angle between the sea or ground level and the trench cross-section baseline setting device is 0°, that is, horizontal.

The altitude measuring part 150 is composed of a GPS and indicates an altitude from the sea level.

Referring to FIG. 8, the trench stratum analysis server 300 of the present invention includes a trench cross-section image communicating part 310, a trench cross-section image correcting part 320, and a trench cross-section stratum map preparing part 330.

The trench cross-section image communicating part 310 receives a fault image photographed by the grid photographing part 110' of the trench baseline setting body part 100 at the trench stratum analysis server 300 (S1510).

The trench cross-section image correcting part 320 calculates a trench inclination and corrects the fault image received by the trench cross-section image communicating part 310 (S1520).

The trench cross-section stratum map preparing part 330 connects the fault images corrected in grid unit (S1530), selects a reference pixel for each stratum (S1540), selects a similar range of the reference pixel for each stratum (S1550), selects a representative pixel within the similar range for each stratum (S1560), edits the image with the representative pixel for each stratum (S1570), and prepares a stratum map of a trench cross-section structure (S1580).

A trench cross-section analysis method using the trench cross-section baseline setting device according to the present invention comprises the steps of: positioning the trench 1 section baseline setting device in a horizontal posture (S1100); performing a laser marker 3 on a trench 1 section with a laser light source part 30 of the trench 1 section baseline setting device (S1200); fixing pins 7 to the laser marker 3 and connecting the pins 7 to each other with a thread 8 to set a grid (S1300); photographing an image of the trench 1 section using a grid photographing part 110' and transmitting the image to a trench stratum analysis server 300 (S1400); and correcting the transmitted image at the trench stratum analysis server 300 to prepare a stratum map of a trench 1 section structure (S1500).

FIG. 9 is a flowchart illustrating a trench cross-section analysis method using a trench cross-section baseline setting device according to one embodiment of the present invention.

Referring to FIG. 9, the trench cross-section analysis method using the trench cross-section baseline setting device includes steps S1100 to S1500.

Step S1100 is a step of positioning the trench cross-section baseline setting device in a horizontal posture.

Step S1200 is a step of performing a laser marker 3 on a trench 1 section with a laser light source part 30 of the trench cross-section baseline setting device.

Step S1300 is a step of fixing pins 7 to the laser marker 3 and connecting pin 7 and pin 7 with a thread 8 to set a grid.

Step S1400 is a step of photographing an image of the trench 1 section using a grid photographing part 110' and transmitting the image to a trench stratum analysis server 300.

Step S1500 is a step of correcting the transmitted image at the trench stratum analysis server 300 to prepare a stratum map of a trench 1 section structure.

FIG. 10 is a flowchart illustrating a program for executing a trench cross-section analysis method using a trench cross-section baseline setting device according to one embodiment of the present invention.

Referring to FIG. 10, the step of correcting the transmitted image at the trench stratum analysis server 300 to prepare a stratum map of a trench 1 section structure (step S1500) includes steps S1510 to S1580.

The step of correcting the transmitted image at the trench stratum analysis server 300 to prepare a stratum map of a trench 1 section structure (step S1500) includes the steps of:

receiving a fault image photographed by the grid photographing part 110' at the trench stratum analysis server 300 (S1510);

calculating a trench inclination to correct the fault image (S1520);

connecting the fault images corrected in grid unit (S1530);

selecting a plurality of reference pixels in a grid unit (S1540);

selecting a similar range of the reference pixels in a grid unit (S1550);

selecting one representative pixel from the plurality of reference pixels for each stratum (S1560);

editing the fault image with the representative pixel corresponding to the respective stratums for each stratum (S1570); and preparing a stratum map of a trench cross-section structure (S1580).

First, the trench stratum analysis server 300 receives the photographed fault image at the trench cross-section image communicating part 310 (S1510); the trench cross-section image correcting part 320 calculates an inclination of the trench 1 to correct the fault image (S1520); the trench cross-section stratum map preparing part 330 connects the images corrected in grid unit (S1530); selects a plurality of reference pixels in a grid unit (S1540), selects a similar range of the reference pixels in a grid unit (S1550), selects a representative pixel within the similar range for each stratum (S1560); edits the image with the representative pixel corresponding to each stratum for each stratum (S1570), and prepare a stratum map of a trench cross-section structure (S1580).

In addition, in the step of selecting one representative pixel from the plurality of reference pixels for each stratum (S1560), a series of colors may be sequentially corresponded in a chronological order of the stratums.

In addition, in the step of selecting one representative pixel from the plurality of reference pixels for each stratum (S1560), a series of colors may be sequentially corresponded in the order of density of representative minerals of the stratums.

So far, specific embodiments of the trench cross-section baseline setting device according to the present invention has been described, but it is obvious that various embodiments can be modified without departing from the scope of the present invention.

Therefore, the scope of the present invention should not be limited to the described embodiments, but should be defined not only by the following claims, but also by the equivalents of the claims.

That is, it should be understood that the above-described embodiments are illustrative in all respects and not restrictive; the scope of the present invention is defined by the following claims rather than by the detailed description; and it should be interpreted that all changes or modifications derived from the meaning and scope of the claims and their equivalent concepts are included in the scope of the present invention.

INDUSTRIAL APPLICABILITY

According to the present invention, there can be provided a trench cross-section baseline setting device for facilitating trenching by making a sensor part automatically level a position of the trench cross-section baseline setting device and projecting a laser from a laser light source to form a laser mark on the trench cross-section; and a trench cross-section analysis method using the same.

DESCRIPTION OF REFERENCE NUMERALS

10: sensor part
20: horizontal part
30: laser light source part
100: trench baseline setting body part
110: interface part
110': grid photographing part
130: direction measuring part
140: horizontal hoovering part
150: altitude measuring part
200: baseline setting tripod support part
230: posture adjusting part
250: height adjusting part
300: trench stratum analysis server

The invention claimed is:

1. A trench cross-section baseline setting device comprising:
a trench baseline setting body part 100 for setting a trench cross-section baseline, wherein the trench baseline setting body part 100 has a sensor part 10 at the center thereof, two horizontal parts 20 orthogonal to each other on the upper surface thereof, and three laser light source parts 30 and a grid photographing part 110', respectively, on the side surfaces thereof;
a baseline setting tripod support part 200 which is rotatably coupled to the trench baseline setting body part 100 and has a posture adjusting part 230 and a height adjusting part 250; and
a trench stratum analysis server 300 for receiving a fault image photographed by the grid photographing part 110' of the trench baseline setting body part 100 to prepare a stratum map of a trench cross-section structure,
wherein the trench stratum analysis server 300 includes a trench cross-section image communicating part 310, a trench cross-section image correcting part 320, and a trench cross-section stratum map preparing part 330, and
wherein the trench stratum analysis server 300 is configured to:
receive the fault image photographed by the grid photographing part 110' at the trench cross-section image communicating part 310;
calculate an inclination of the trench 1 to correct the fault image at the trench cross-section image correcting part 320;
connect the fault images corrected in a grid unit at the trench cross-section stratum map preparing part 330;
select a plurality of reference pixels in a grid unit at the trench cross-section stratum map preparing part 330;
select a similar range of the reference pixels in a grid unit at the trench cross-section stratum map preparing part 330;
select one representative pixel from the plurality of reference pixels for each stratum at the trench cross-section stratum map preparing part 330;
edit the fault image with the representative pixel corresponding to the respective stratums for each stratum at the trench cross-section stratum map preparing part 330; and
prepare a stratum map of a trench cross-section structure at the trench cross-section stratum map preparing part 330.

2. The trench cross-section baseline setting device of claim 1, wherein the sensor part 10 of the trench baseline setting body part 100 includes an interface part 110, a direction measuring part 130, a horizontal hoovering part 140, and an altitude measuring part 150.

3. The trench cross-section baseline setting device of claim 2, wherein the laser light source part 30 of the trench baseline setting body part 100 operates only when the measured value of the horizontal hoovering part 140 of the sensor part 10 is 0°.

4. The trench cross-section baseline setting device of claim 2, wherein the posture adjusting part 230 of the baseline setting tripod support part 200 controls the posture so that the measured value of the horizontal hoovering part 140 of the sensor part 10 of the trench baseline setting body part 100 is 0°.

5. The trench cross-section baseline setting device of claim 1, wherein the height adjusting part 250 of the baseline setting tripod support part 200 adjusts the height stepwise in response to a set grid interval.

6. A trench cross-section analysis method using a trench cross-section baseline setting device, the method comprising:
positioning the trench cross-section baseline setting device horizontally (S1100);
forming a laser marker 3 on a trench 1 section with a laser light source part 30 of the trench cross-section baseline setting device (S1200);

fixing pins 7 to the laser marker 3 and connecting between pin 7 and pin 7 with a thread 8 to set a grid (S1300);

photographing an image of the trench 1 section using a grid photographing part 110' and transmitting the image to a trench stratum analysis server 300 (S1400); and correcting the transmitted image at the trench stratum analysis server 300 to prepare a stratum map of a trench 1 section structure (S1500), wherein the correcting of the transmitted image at the trench stratum analysis server 300 to prepare the stratum map of the trench 1 section structure (S1500) comprises:

receiving a fault image photographed by the grid photographing part 110' at the trench stratum analysis server 300 (S1510);

calculating an inclination of the trench 1 to correct the fault image (S1520);

connecting the fault images corrected in a grid unit (S1530);

selecting a plurality of reference pixels in a grid unit (S1540);

selecting a similar range of the reference pixels in a grid unit (S1550);

selecting one representative pixel from the plurality of reference pixels for each stratum (S1560);

editing the fault image with the representative pixel corresponding to the respective stratums for each stratum (S1570); and preparing a stratum map of a trench cross-section structure (S1580).

7. The trench cross-section analysis method using a trench cross-section baseline setting device according to claim 6, wherein, in the selecting of the one representative pixel from the plurality of reference pixels for each stratum (S1560), a series of colors are sequentially corresponded in a chronological order of the stratums.

8. The trench cross-section analysis method using a trench cross-section baseline setting device according to claim 6, wherein, in the selecting of the one representative pixel from the plurality of reference pixels for each stratum (S1560), a series of colors are sequentially corresponded in the order of density of representative minerals of the stratums.

9. A non-transitory computer-readable recording medium storing a program, that when executed, causes a trench stratum analysis server 300 coupled with a trench cross-section baseline setting device to:

receive a fault image photographed by a grid photographing part 110' at a trench cross-section image communicating part 310 (S1510);

calculate an inclination of the trench 1 to correct the fault image at a trench cross-section image correcting part 320 (S1520);

connect the fault images corrected in a grid unit at a trench cross-section stratum map preparing part 330 (S1530);

select a plurality of reference pixels in a grid unit at the trench cross-section stratum map preparing part 330 (S1540);

select a similar range of the reference pixels in a grid unit at the trench cross-section stratum map preparing part 330 (S1550);

select one representative pixel from the plurality of reference pixels for each stratum at the trench cross-section stratum map preparing part 330 (S1560);

edit the fault image with the representative pixel corresponding to the respective stratums for each stratum at the trench cross-section stratum map preparing part 330 (S1570); and prepare a stratum map of a trench cross-section structure at the trench cross-section stratum map preparing part 330 (S1580).

* * * * *